US006321187B1

(12) United States Patent
Squier et al.

(10) Patent No.: US 6,321,187 B1
(45) Date of Patent: Nov. 20, 2001

(54) SYSTEM RELIABILITY ASSESSMENT TOOL

(75) Inventors: Steven E. Squier; Eric A. Henderson, both of Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 09/218,708

(22) Filed: Dec. 22, 1998

(51) Int. Cl.[7] ............................. G06F 17/50; G06G 7/62
(52) U.S. Cl. ................................. 703/18; 703/17
(58) Field of Search .................. 703/18, 17, 13

(56) References Cited

U.S. PATENT DOCUMENTS

| 4,847,795 | 7/1989 | Baker et al. | 364/579 |
|---|---|---|---|
| 5,138,694 | 8/1992 | Hamilton | 395/10 |
| 5,144,563 | 9/1992 | Date et al. | 364/491 |
| 5,224,057 | * 6/1993 | Igarashi et al. | 716/13 |
| 5,257,201 | 10/1993 | Berman et al. | 364/489 |
| 5,293,585 | 3/1994 | Morita | 395/52 |
| 5,386,498 | 1/1995 | Kakefuda | 395/75 |
| 6,125,453 | * 9/2000 | Wyss | 714/1 |

FOREIGN PATENT DOCUMENTS

| 59-184969 | 10/1984 | (JP) . |
|---|---|---|
| 3-201033 | 9/1991 | (JP) . |

OTHER PUBLICATIONS

Wjyss et al.; "Probabilistic logic modeling of network reliability for hybrid network architectures": IEE Conf. Local Computer Networks; pp. 404–413, Oct. 1996.*

El–Sayed et al.; "Fuzzy sets for reliability assessment of electric power distribution systems";IEEE Proc. Circuits and Systems; pp. 1491–1494, Aug. 1994.*

Sharaf et al.; Reliability evaluation in power–system transmission planning: practical considerations; pp. 274–279, Aug. 1988.*

Elliot; "Computer–assisted fault–tree construction using a knowledge–based approach"; IEEE Trans. Reliability; pp. 112–120, Mar. 1994.*

Alexopoulos;"A note on state–space decomposition methods for analyzing stochastic flow networks"; IEEE Trans. Reliability; pp. 354–357, Jun. 1995.*

Kishimoto; "Reliable flow with failures in a network"; IEEE Trans. Reliability; pp. 308–315, Sep. 1997.*

* cited by examiner

Primary Examiner—Kevin J. Teska
Assistant Examiner—Hugh Jones
(74) Attorney, Agent, or Firm—Marshall, O'Toole, Gerstein, Murray & Borun

(57) ABSTRACT

A method for assessing the reliability of an electrical power distribution system begins with identifying each element of the electrical power distribution system, and establishing characteristic data for each of these elements. The characteristic data at least identifies one operating characteristic of the element and further identifies interconnections of that element to other elements in the system. Next, at least one "minimum cut" is determined separating a first system element from a second system element, e.g., a power source from a load. The minimum cut is at least based upon the interconnection data. At least one third element is then identified, located on the minimum cut, and the reliability may then be assessed by evaluating the characteristic data of the at least one third element.

20 Claims, 6 Drawing Sheets

SYSTEM RELIABILITY ASSESSMENT TOOL

FIELD OF THE INVENTION

The present invention relates generally to computer aided engineering tools, and more particularly, the present invention relates to a tool for assessing the reliability of an electrical power system.

BACKGROUND OF THE INVENTION

The typical determination of reliability of a system is straightforward yet potentially very time-intensive. To assess the reliability of a system one needs only to identify the total different possible states of the system (with respect to the operational status of each component), determine which of these states result in the failure of the specific system, calculate the probabilities of each of these failure states occurring, and sum them to arrive at the overall reliability.

In the case of an electrical power system, a failure of the system is generally considered to be loss of power to a particular load, e.g., a starting motor, a load bus, etc. The task of assessing the reliability of an electrical power system is formidable because there are ordinarily several components to the system, and with each component having at least two possible states, operational or non-operational there are at least 2 raised to the power of the number of total system components possible states. In even a modest electrical power system the number of components could be 20 or more, which establish a total number of possible states in excess of 1 million.

More than simply assessing the reliability of a single system, system designers and engineers typically wish to evaluate several system designs. Having to assess millions of possible operational states for each system design is time and cost prohibitive.

Computer added engineering tools have been available for a number of different applications. For example U.S. Pat. No. 4,847,795 discusses a system for diagnosing defects in electronic assemblies. Actual test data is gathered and analyzed to determine failure patterns, which are used to estimate failure probabilities given certain constraint conditions.

In U.S. Pat. No. 5,138,694 a qualitative reasoning approach is applied to observed failure symptoms to identify the reasons for a particular failure. The system does not contemplate predicting failures, and instead focuses on determining failure causes and employs a fault tree analysis approach.

The disclosure of U.S. Pat. No. 5,144,563 is directed to a system to aid in the design of computer chips, and more particularly, to reducing wiring lengths between components. Similarly, U.S. Pat. No. 5,257,201 discloses a system that attempts to reduce the number of connections in an integrated circuit. And, Japanese patent no. 59-184969 discloses use of the "minimum cut" method to optimize integrated circuit design, again by reducing wiring lengths.

In U.S. Pat. No. 5,293,585 an expert system is disclosed apart from any particular application. The expert system implements a rule-based reasoning approach to failure analysis and fault detection.

U.S. Pat. No. 5,386,498 also describes an expert system capable of drawing conclusions based on experience. Knowledge bases are built and updated through a proposed process.

An article appearing in the July, 1986 issue of Computer magazine discusses a system for troubleshooting failed electronics using artificial intelligence. The system uses a fault detection and isolation approach to identify a failed hardware device within a larger system.

It is clear numerous computer based systems and methods are available to assist in the design of electrical systems and components. However, there remains a need for a tool for quickly evaluating the reliability of system designs, and particularly power distribution system designs and variations and alternatives thereto.

SUMMARY OF THE INVENTION

In accordance with one aspect of the present invention, a method for assessing the reliability of an electrical power distribution system begins with identifying each element of the electrical power distribution system, and establishing characteristic data for each of these elements. The characteristic data at least identifies one operating characteristic of the element and further identifies interconnections of that element to other elements in the system. Next, at least one "minimum cut" is determined separating a first system element from a second system element, e.g., a power source from a load. The minimum cut is at least based upon the interconnection data. At least one third element is then identified, located on the minimum cut, and the reliability may then be assessed by evaluating the characteristic data of the at least one third element.

Additionally, the method may include identifying a plurality of elements on the minimal cut, and assessing reliability of the system based at least upon the characteristic data associated with each of the plurality of elements.

BRIEF DESCRIPTION OF THE DRAWINGS

These and other advantages and features of the present invention will become apparent to one of ordinary skill in the art upon review of the following description of several preferred embodiments with reference to the accompanying drawings in which.

DETAILED DESCRIPTION OF THE PREFERRED EMBODIMENTS

The present invention is described in terms of several preferred embodiments relating to a tool for analyzing the reliability of a complex system and particularly, analyzing the reliability of complex electrical power distribution systems. Its application is not limited to such systems, and the present invention may be used in hydraulic systems, optical systems, etc., without departing from its fair scope. Data representing the system under analysis may be directly input into the tool, may be downloaded to the tool, or the tool itself may be coupled to or integrated into a larger computer based system design/engineering tool.

Figure 1:
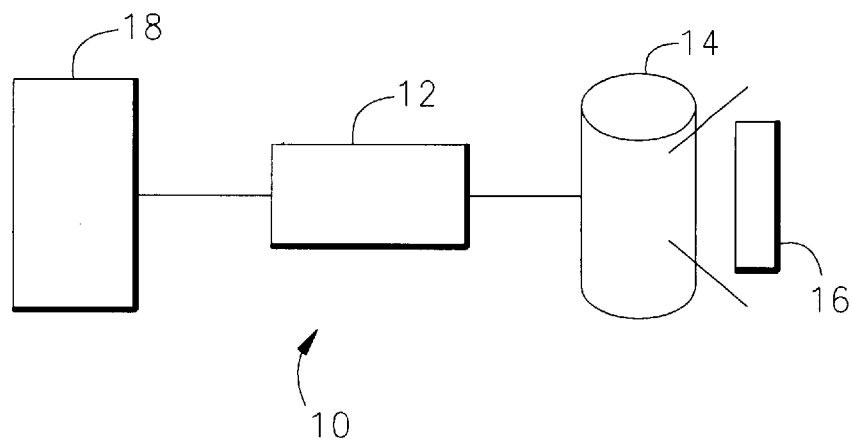
FIG. 1 is a block diagram illustration of a preferred implementation of the system reliability assessment tool of the present invention.

With reference to FIG. 1, a system reliability assessment tool 10 includes a processor 12 coupled to a memory 14, including a data structure 16, and to a user interface 18. Preferably contained within memory 14, and within data structure 16, is program code implementing the reliability assessment tool of the present invention. In addition, while shown as separate elements, it will be readily appreciated that processor 12, memory 14 and user interface 18 may be implemented together in a personal computer using the Windows operating environment, in a standalone engineering workstation product, in a network including workstations and network servers, or in other suitable computing environments including processing capability, memory and input/output elements.

Figure 2:
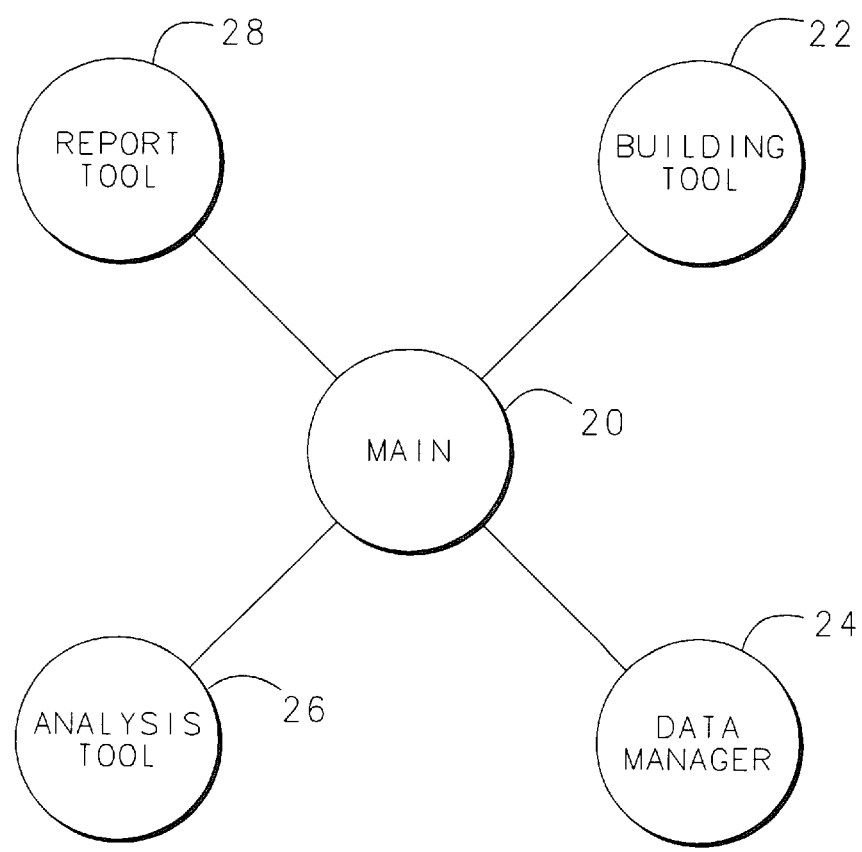
FIG. 2 is relationship diagram illustrating preferred operational elements of the system reliability assessment tool of the present invention.

Referring now to FIG. 2, operational elements of system reliability assessment tool 10 include main function 20, building tool 22, data manager 24, analysis tool 26 and report tool 28. Main function task 20 provides a computer operating environment for system reliability assessment tool 10, and as noted is preferably the Windows operating environment. Main function task 20 therefore provides processor control functions utilizing standardized Windows operating procedures and menu structures and includes data manager 24 providing file and data management and input/output data management. System reliability assessment tool 10 may be implemented using the software package Kappa-PC, ver. 2.2, commercially available from Intellicorp, running within the Windows environment, but may also be implemented on alternate software platforms, such as Microsoft Excel, without departing from the fair scope of the present invention.

The system data includes data identifying each of the elements forming the system, characteristic data for each element and interconnection data relating each element to other elements of the system. Data representing the design of a power distribution system may be input into tool 10 using the user interface 18 and building tool 22 and retained in data structure 16 of memory 14. System information may also be downloaded to the tool 10 from an external source and retained within data structure 16 of memory 14. As also noted, tool 10 may be coupled to or integrated into an overall engineering design tool, and in this implementation tool 10 may directly interface with the memory of such engineering design tool to access, copy or write data.

Figure 3:
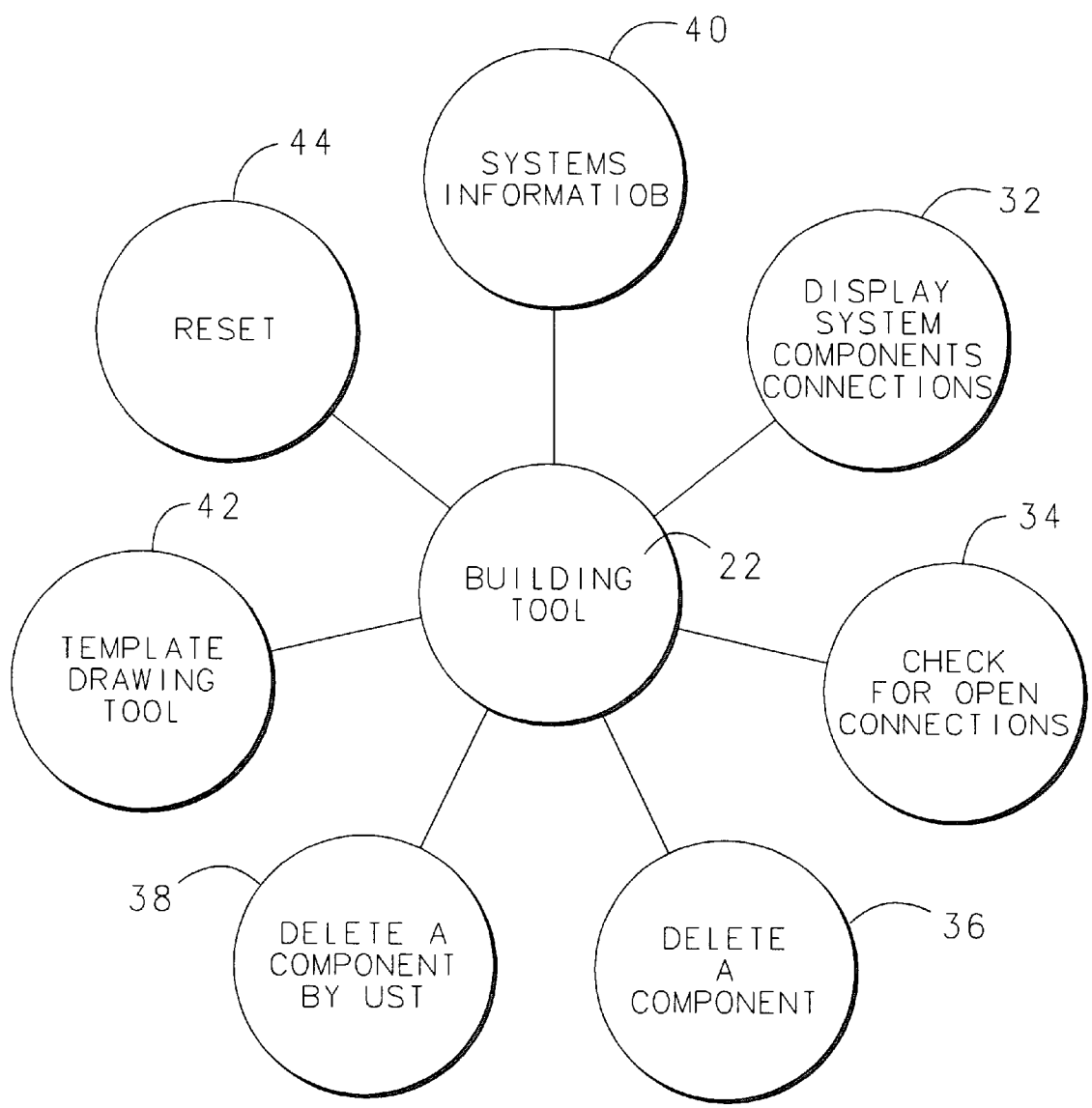
FIG. 3 is a relationship diagram illustrating preferred elements forming the building tool portion of the tool illustrated in FIG. 2.
Figure 4:
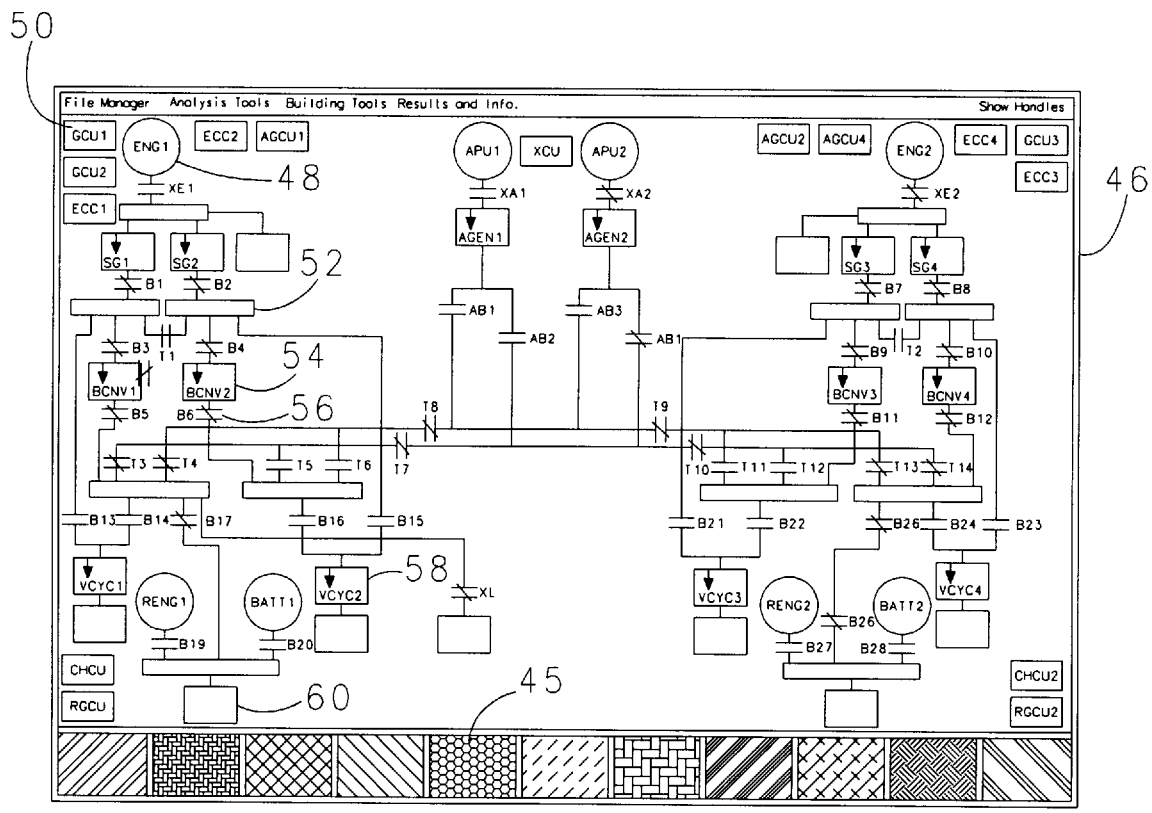
FIG. 4 is a sample preferred screen display.

With reference to FIG. 3 building tool 22 provides a number of functions, namely: display system components bar 32, check for open connections 34, delete a component 36, delete a component by list 38, system information 40, template drawing tool 42 and system reset 44. In a preferred embodiment, the system elements and interconnections are represented in a graphic display 46 (FIG. 4) using user interface 18. With reference to FIG. 4, various icon representations are used in graphic display 46 to represent, for example, a power source 48, a control element 50, a bus structure 52, a converter 54, a contactor 56, a generic element 58, a load 60 and various other elements as are found in a power distribution system design. Of course, additional representations may be provided or altered to suit application of the present invention to other system types. Graphic display 46 also provides a convenient environment for the user to view the system under analysis, and using building tool 22, to modify or otherwise manipulate the system data graphically. Building tool 22 is operable upon the graphic data to generate data representing the system and its interconnections, which is then stored within data structure 16. The user may also associate characteristic data, described more fully below, with the elements of the system. The characteristic data is also stored in the data structure contained within memory 14. System elements are interconnected by drawings lines (47 in FIG. 4) representing electrical feeder elements between them, and these electrical feeder elements also possess characteristic data. Control unit interconnections are not represented by lines to the controlled element; however, the control unit and the controlled element each include interconnection data representing the relationship therebetween. The interconnection data is utilized in analysis of system reliability.

The data structure may take on any suitable form providing at least for the unique identification of each system element, the retention of the characteristic data for each element, and the retention of the interconnection data for each element. Other data may also be stored as desired or otherwise required for the operating system. Suitable data structures include, but are not limited to lists, arrays, or object type data structures.

The elements of building tool 22, and referring again to FIG. 2, facilitate the input and manipulation of the system data. Graphic display 46 preferably has color capability and in addition to identifying elements by icon, elements may be identified using color. The display system component bar 32 displays a system components bar 45 along a portion of graphic display 46 providing a color legend. The display system components bar 32 is also used in conjunction with the template drawing tool 42 to define and edit system data. The delete component 36 and the delete component by list 38 functions, as the names suggest, allow for deleting from the system definition various elements or interconnections. The delete component 36 function allows for selecting a particular element, using well known point and click techniques, and deleting the selected component from the system definition. The delete component by list 38 function provides a list of the components in a separate viewing window from which components may be selected and deleted. The system information 40 function allows for input and/or viewing of data identifying the system, such as a name, revision data, etc. The check for open connection 34 function does, as its name implies, searches to ensure all elements are linked and that no open connections within the represented power distribution circuit exist. The characteristic data of the system elements may be altered in order to evaluate the effect of the element on the overall system design. The system reset 44 function provides a convenient tool for resetting each of the system elements to an initial configuration.

The template drawing tool 42 provides the vehicle for creating or modifying a system definition. System components may be selectively added to the system definition by selecting standard component types from the system components bar and locating the component graphically within the system. Also provided is an ability to input and/or edit the characteristic information associated with each system component and/or to add generic elements with user defined data. When a new component is added or an existing component is edited, the user is provided instructions in the form of a dialog window for entering the characteristic data or for selecting a default characteristic data set for the element type. The system definition is automatically updated within data structure 16.

Figure 5:
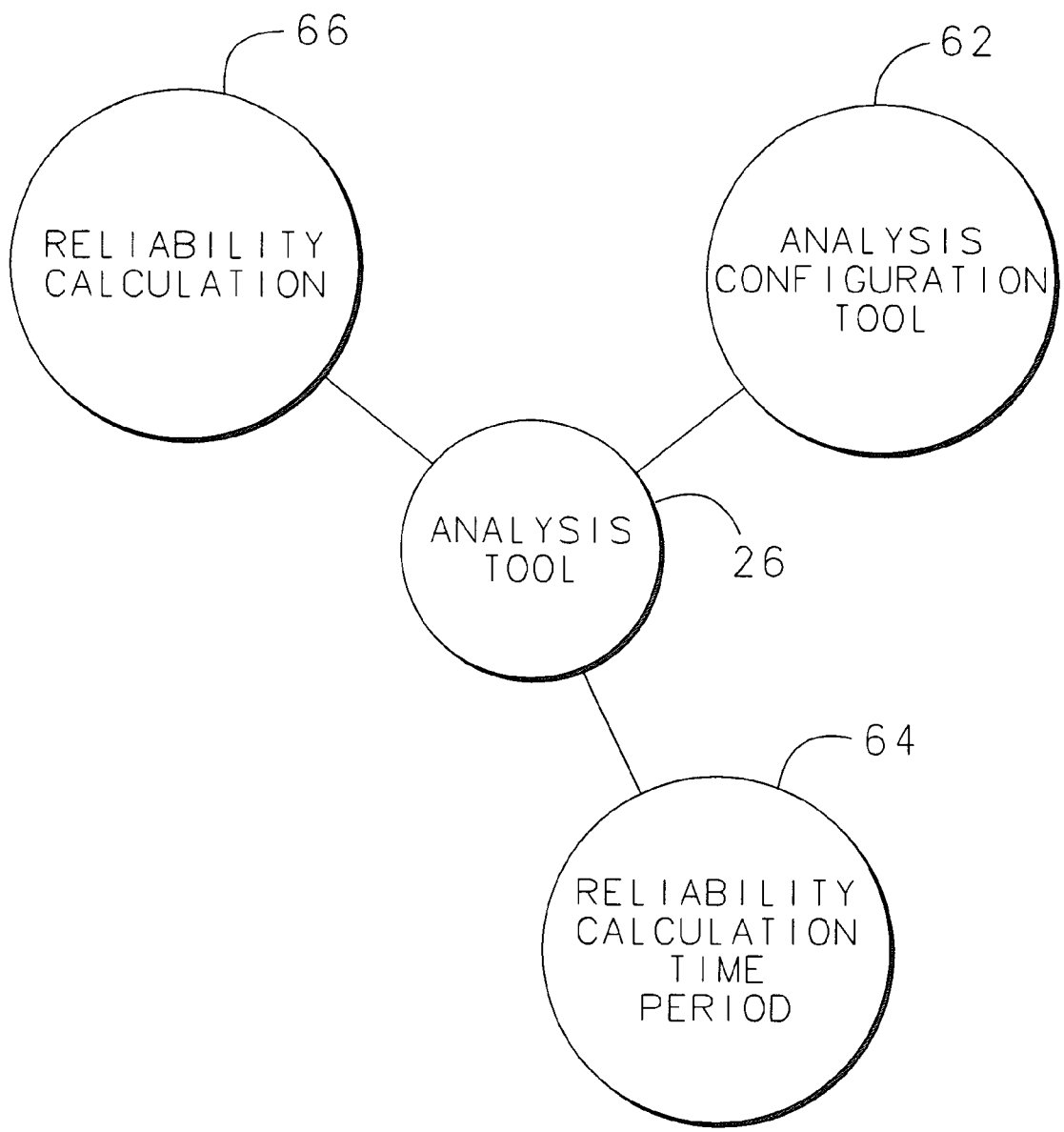
FIG. 5 is a relationship diagram illustrating preferred elements forming the analysis tool portion of the tool illustrated in FIG. 2.

With reference now to FIG. 5, analysis tool 26 includes an analysis configuration tool 62, a reliability calculation time period function 64 and reliability calculation function 66. The configuration tool 62 allows the user to configure various analysis parameters. For example, the user may specify the degree of minimal cut evaluation to use, which as explained more fully below impacts the computation time and the fidelity of the results. The reliability calculation time period function 64 allows the user to set a desired reliability time period. The probability of a failure in a system depends on how long a system operates. For aircraft systems, for example, a time period of one (1) hour is typically used as it relates to an approximate average flight time. Of course the time period is set in relation to the anticipated operating period of the system under analysis. Reliability calculation function 66, as will be described, provides for calculation of the system reliability based upon the characteristic and interconnection data. As will also be described, it provides for a sensitivity calculation.

Figure 6:
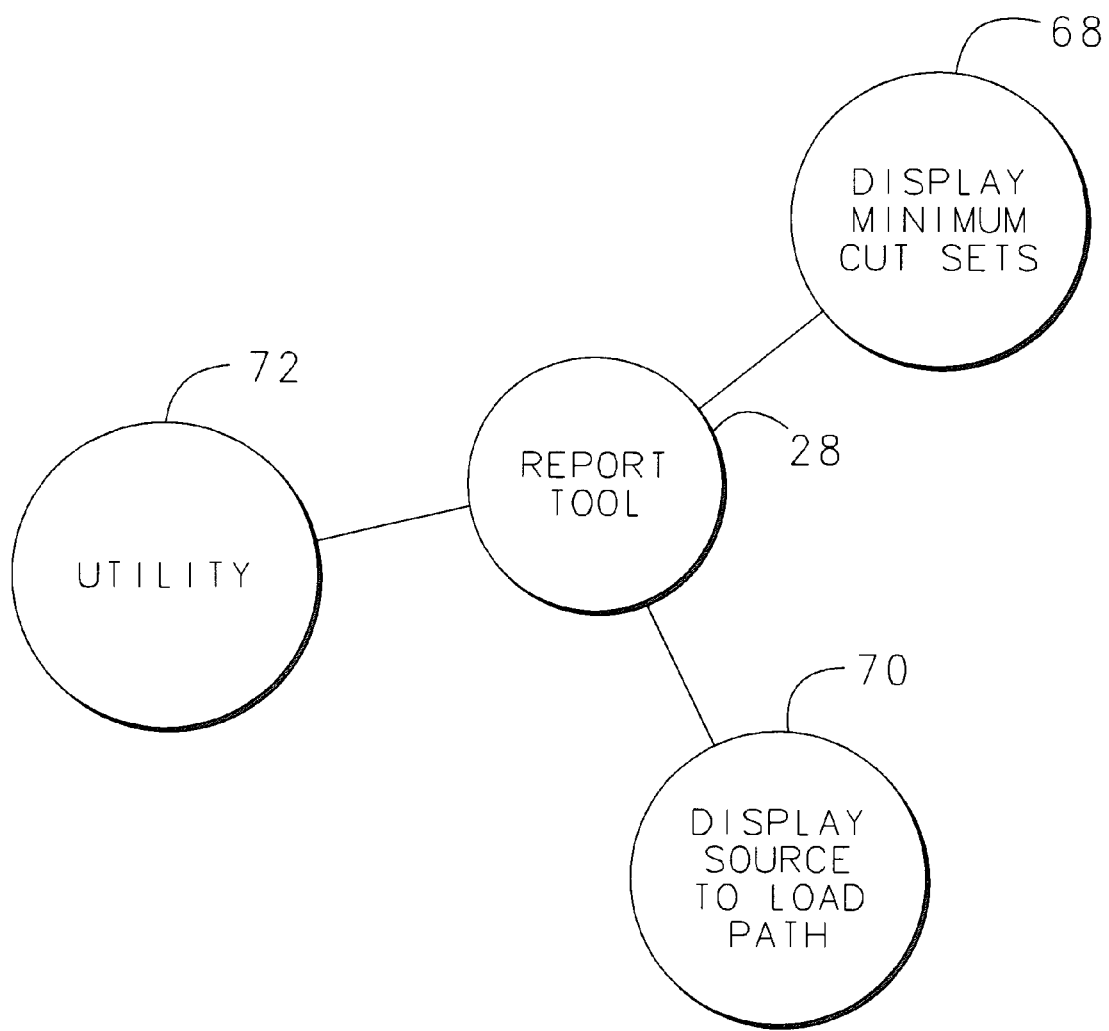
FIG. 6 is a relationship diagram illustrating preferred elements forming the report portion of the tool illustrated in FIG. 2.

Referring to FIG. 6, report tool 28 includes a display minimum cut sets function 68, a display source to load path function 70 and an utility 72 for printing the analysis results as well as the system information including generally the contents of data structure 16.

In accordance with the preferred embodiments of the present invention, system reliability is determined using a "minimum cut" analysis of the system data including the characteristic data and the interconnection data. Preferably, each system element represents a node within the network having characteristics defined by the characteristic data. The characteristic data, for example, will identify the type of device, power source, load, connector, controller, etc., how power flows through the device, for example, bidirectionally, unidirectionally and if so the direction, and reliability data, e.g., mean time to failure, failure probability, number and types of failure modes, etc. The interconnection data define connections or paths between the nodes, i.e., the system elements. A cut is a group of interconnected system elements that isolate a power source from a load, and where the failure of each of the components in the group will cause the system to fail. A minimum cut is a set of interconnected system elements which has no subset of system elements that will also cause a system failure. All distinct minimum cuts are identified and analyzed by system 10.

Figure 7:
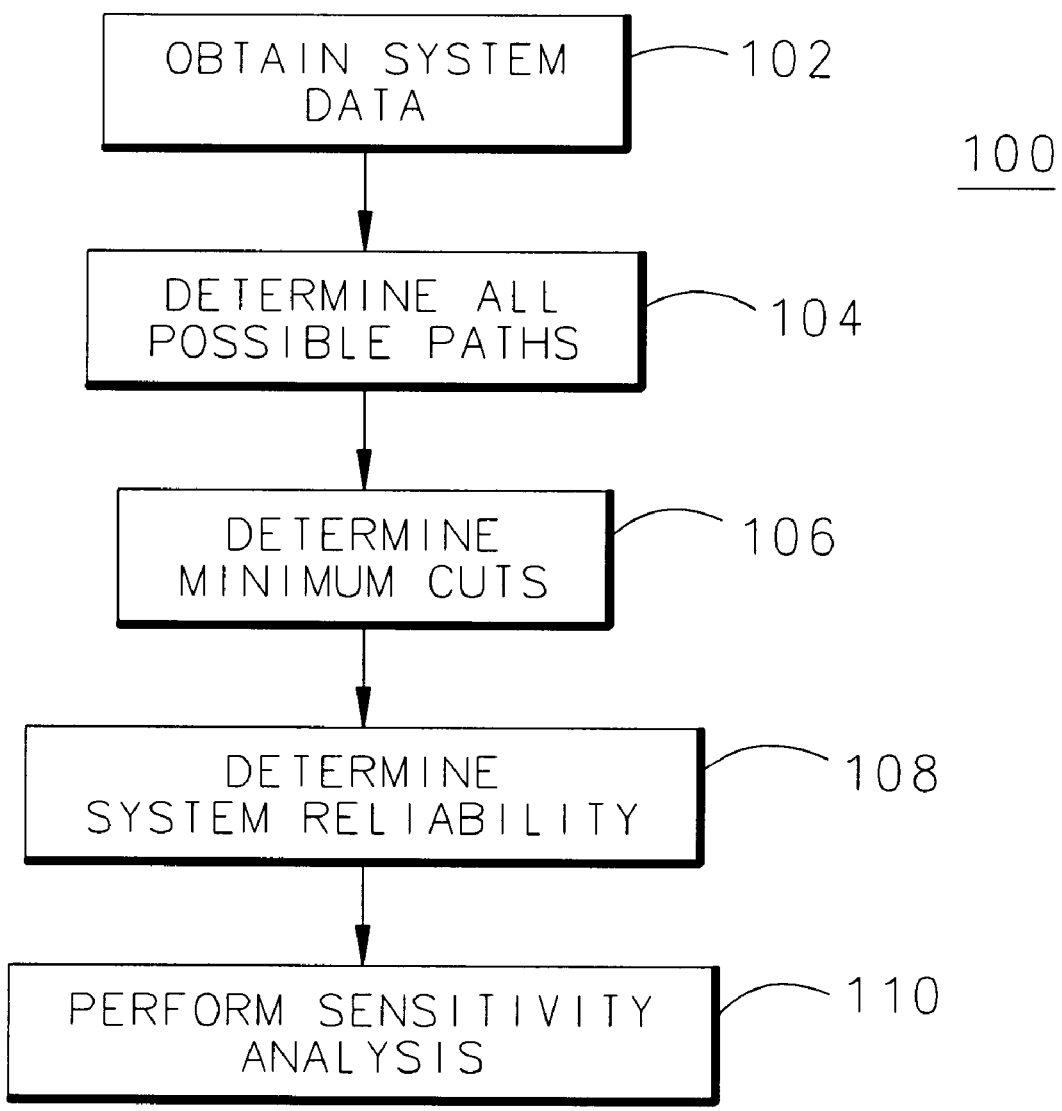
FIG. 7 is a flowchart illustrating analysis steps in accordance with the preferred embodiments of the present invention.

Referring then to FIG. 7, operation of system 10 for determining system reliability is described in more detail in conjunction with the method 100 illustrated therein. At step 102, the system data is retrieved, which in the preferred embodiment is the system data created using the user interface 18 and building tool 22. Next, at step 104, all of the possible paths between power sources and loads are determined using the interconnection data, and at step 106, the minimum cuts are determined. With the minimum cuts now identified, system reliability may be estimated at step 108. In addition to determining system reliability, at step 110, a sensitivity analysis on the system data is performed to identify those systems elements which most contribute to system reliability problems. Both the estimated system reliability data and the sensitivity data is useful to the system designer in preparing the system design to be robust.

In accordance with the preferred embodiments, the determination of all possible paths at step 104 is accomplished by evaluating the interconnection data. The purpose is to determine for each load element defined in the system all possible paths from which the load can derive power. Evaluation begins at a source. When a connection branch point is reached (which may only occur at component interfaces) the program selects one of the available legs and continues to travel through the connected paths until one of the following events occurs:

1) all paths available for continued travel from a branch point have already been traveled upon (this procedure prevents the system from becoming caught in a circular loop);

2) none of the available paths allow travel in the desired direction (for example, the system cannot send power through a unidirectional component opposite the direction indicated, or across an open contactor);

3) another active power source is encountered (essentially a dead end);

4) a load other than the one desired for reliability assessment is encountered (also a dead end);

5) the desired load is encountered.

In all of the above-cases with the exception on case 5, a valid path from the source to the load has not been identified. System 10 keeps a connection history record within data structure 16 which tracks only the valid source-to-load paths. Stored in association with each valid path is a listing of the system elements that power can travel through along the path to reach the load.

From the identified valid paths, at step 106 the minimum cuts are determined. Initially the paths containing a single element are identified. These paths indicate a single failure point, or a single element minimum cut, where failure of this one component would cause the undesirable loss of power to the desired load. Once all the single element minimum cuts are identified, system 10 proceeds to detect double element minimum cuts, triple element minimum cuts, etc. By definition, the double element minimum cuts would not contain any of the single element minimum cuts previously identified. Likewise, the triple element minimum cuts would not contain single or double element minimum cuts, and so on until all of the levels of minimum cuts to a desired analysis level are identified.

Typically, the contribution to overall system reliability for triple element or more minimum cuts is negligible (at least for power distribution applications). System 10 is capable of evaluating system reliability using up to virtually any level of minimum cuts. The trade-off is compute time/complexity to fidelity of the results. Using the analysis configuration tool 62, the user is allowed to define the level of evaluation based on the system type. For simple architectures double minimal cuts may be adequate and are quick to run. More complex architectures may require higher level of minimum cuts, three or four or more element minimum cuts, for example.

The characteristic data defined for each system element includes definition of element failure rates, number of modes of failure, probability of failure, etc., which is then utilized to determine the reliabilities for each minimum cut. The system reliability is then established as the product of the failure probability for each minimum cut.

It should be noted that the determined system reliability is an estimate and one well suited to compare different system architectures. The approximation is best where the reliability of each of the system elements are close to unity. As the reliability of the individual system elements moves away from unity, the estimation deviates from the true system reliability, but in all cases provides a conservative estimate.

At step 110, if desired, a sensitivity analysis may be performed to determine impact of individual system elements on the overall system reliability. The sensitivity analysis proceeds by, for each system element, varying its defined reliability value by 10 percent and reevaluating the system reliability with this changed value. Of course other percentage changes may be used. After the analyses are completed for each of the system components, each of the resulting system reliability determinations are prioritized to show the relative effect of each of the system components. Advantageously, the system designer may use this information to determine where changes in the system design may have the most impact.

The report tool 28 provides a convenient interface whereby the user may view and print the analysis results. Additionally, system 10 highlights each of the source-to-load paths as well as key source-to-load paths which have the greatest impact on system reliability by, for example, changing the color of the path on graphic display 46.

Operation of system 10, apart from input of user provided data, is automated. System 10 further provides an analysis capability otherwise outside the reach of the system designer and can be of great benefit in designing improved, more reliable power systems. While described in terms of several preferred embodiments in association with the evaluation of power distribution systems, it will be readily appreciated that the present invention has application to numerous other system types. The preferred embodiments described herein should in no way be taken as limiting of its many potential applications. To determine the true and fair scope of the present invention, reference is made to the subjoined claims.

We claim:

1. A method for assessing the operational reliability of an electrical power distribution system comprising the steps of:
   identifying each element of the electrical power distribution system;
   for each element, establishing characteristic data, the characteristic data identifying at least one operating characteristic of the element, and interconnection data, the interconnection data identifying interconnections of the element to at least one other element of the electrical power distribution system;
   using the identification data to determine all possible paths within the electrical power distribution system interconnecting the element to the at least one other element;
   determining from the all possible paths valid paths interconnecting the element and the at least one other element, wherein a valid path terminates at the at least one other element, is not a redundant path, does not violate permitted flow directions and does not include other active power sources or load elements;
   determining from the valid paths at least one minimum cut from a first element of the electrical power distribution system to a second element of the electrical power distribution system based upon the interconnection data;
   identifying at least a third element of the electrical power distribution system on the minimum cut;
   assessing reliability of the minimum cut based at least upon the characteristic data associated with the third element; and
   assessing the operational reliability of the electrical power distribution system based at least upon the reliability of the minimum cut.

2. The method of claim 1, further comprising the steps of:
   identifying a plurality of elements on the minimum cut; and
   assessing reliability of the minimum cut based at least upon the characteristic data associated with each of the plurality of elements.

3. The method of claim 1, the first element comprising a power source element and the second element comprising a load element.

4. The method of claim 1, further comprising the steps of:
   for the first element determining a group of paths including all possible paths extending from the first element, and
   selecting for analysis only paths connecting the first element to the second element.

5. The method of claim 1, further comprising the steps of:
   determining a plurality of minimum cuts from the first element to the second element,
   ranking the minimum cuts based upon a number of elements located on each of the plurality of minimum cuts.

6. The method of claim 5, further comprising the step of eliminating from analysis minimum cuts including more than a predetermined number of elements.

7. The method of claim 5, further comprising the step of selecting a level of minimum cuts for analysis based upon a system architecture.

8. The method of claim 5, further comprising the step of eliminating from analysis minimum cuts including a subset of minimum cut including fewer elements.

9. The method of claim 1, further comprising the step of identifying a sensitivity of the electrical power distribution system to at least one system element.

10. The method of claim 9, wherein the step of identifying a sensitivity comprises the steps of:
    individually for each element modifying in a predetermined manner an aspect of the characteristic data and reassessing system reliability utilizing the modified characteristic data; and
    ranking the elements based upon results of the system reliability assessment using the modified characteristic data.

11. The method of claim 9, wherein the step of modifying in a predetermined manner an aspect of the characteristic data comprises increasing a failure rate of the element a predetermined percentage amount.

12. A system reliability assessment tool comprising:
    a processor coupled to a user interface and to a memory, the memory including a data structure containing system data representing a plurality of elements and containing for each of the plurality of elements characteristic data and interconnection data, the memory further including an analysis algorithm;
    the analysis algorithm including structure for:
    i) using the interconnection data to determine all possible paths within the electrical power distribution system interconnecting a first element to at least one other element;
    ii) determining from the all possible paths valid paths interconnecting the element and the at least one other element, wherein a valid path terminates at the at least one other element, is not a redundant path, does not violate permitted flow directions and does not include other active power sources or load elements;
    iii) determining at least one minimum cut from the valid paths;
    iv) identifying at least a third element of the plurality of elements on the minimum cut;
    v) assessing reliability of the minimum cut based at least upon the characteristic data associated with the third element; and
    vi) assessing system reliability based at least upon the reliability of the minimum cut; and the processor operable upon the system data in accordance with the analysis algorithm to provide an indication representing a reliability of the system.

13. The system reliability assessment tool of claim 12, wherein the analysis algorithm further comprises structure for:
   i) individually for each of the plurality of elements modifying in a predetermined manner an aspect of the characteristic data and reassessing system reliability utilizing the modified characteristic data; and
   ii) ranking the plurality of elements based upon a result of the system reliability assessment using the modified characteristic data; and the processor being further operable upon the system data to rank the plurality of system elements to provide an indication of relative contribution to system reliability of each of the plurality of elements.

14. The system reliability assessment tool of claim 12, wherein the characteristic data comprises at least one reliability data selected from the group of data comprising: a mean time to failure, a failure probability, a number of failure modes and a type of failure mode.

15. The system reliability assessment tool of claim 12, wherein the interconnection data defines a relationship between the first element and at least one additional system element.

16. The system reliability assessment tool of claim 12, wherein a minimum cut comprises a set of interconnected system elements which isolate a power source element from a load element and in which no subset of the set will cause a system failure.

17. The system reliability assessment tool of claim 12, wherein the user interface includes a graphic display of the system data.

18. The system reliability assessment tool of claim 12, further comprising a system data manipulation tool.

19. The system reliability assessment tool of claim 12 integrated into a computer aided engineering tool.

20. The system reliability assessment tool of claim 12 implemented in a Windows operating system environment.

* * * * *